US011696577B2

(12) United States Patent
Spangler et al.

(10) Patent No.: US 11,696,577 B2
(45) Date of Patent: *Jul. 11, 2023

(54) SPIDER AND INSECT TRAP WITH LURE COMPARTMENT

(71) Applicant: Woodstream Corporation, Lancaster, PA (US)

(72) Inventors: Chad E. Spangler, Palmyra, PA (US); Aswathi John, Bellevue, PA (US); Brent D. Hardy, Lancaster, PA (US); Chad Mateer, Manheim, PA (US)

(73) Assignee: Woodstream Corporation, Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,871

(22) Filed: May 23, 2022

(65) Prior Publication Data

US 2022/0322650 A1    Oct. 13, 2022

Related U.S. Application Data

(63) Continuation of application No. 16/708,474, filed on Dec. 10, 2019, now Pat. No. 11,337,413.

(51) Int. Cl.
*A01M 1/14* (2006.01)
*A01M 1/02* (2006.01)

(52) U.S. Cl.
CPC ............... *A01M 1/14* (2013.01); *A01M 1/02* (2013.01); *A01M 2200/011* (2013.01)

(58) Field of Classification Search
CPC .......... A01M 1/02; A01M 1/103; A01M 1/14; A01M 2200/01
See application file for complete search history.

(56) References Cited

U.S. PATENT DOCUMENTS

| 5,588,250 | A | 12/1996 | Chiba et al. | |
|---|---|---|---|---|
| 5,930,944 | A * | 8/1999 | Knuppel | A01M 1/00 43/114 |
| 10,123,534 | B2 * | 11/2018 | Olson | A01N 41/12 |
| 2008/0302000 | A1 * | 12/2008 | Kidder | A01M 1/20 43/131 |
| 2010/0074860 | A1 | 3/2010 | Kupfer et al. | |
| 2010/0154290 | A1 | 6/2010 | Fisher | |
| 2016/0347829 | A1 | 12/2016 | Nordgren et al. | |

OTHER PUBLICATIONS

JT Easton Pest Catchers Spider & Cricket Glue Trays, www.Jteaton.com/product/pest-catchers-larger-spider-cricket-glue-trap/.
ELIMINATOR Spider & Insect Traps, www.amazon.com/Eliminator-Spider-Insect-Traps-Se/dp/.
TERRO Spider & Insect Traps, www.victorpest.com/t3206.
Rescue Spider Traps, www.rescue.com/products/traps/spider-trap/.
TOMCAT Household Pest Glue Boards, www.tomcatbrand.com/en-us/products/tomcat-household-pest-glue-boards.
Harris Spider Traps, www.pfharris.com/product/harris-spider-traps-2-pack/.

* cited by examiner

*Primary Examiner* — Joshua J Michener
*Assistant Examiner* — Henry Hooper Mudd
(74) *Attorney, Agent, or Firm* — Barley Snyder

(57) ABSTRACT

A glue board trap for insects and spiders is provided that includes a reusable housing, a replaceable glue board, and a reusable lure compartment that is mounted to the housing. The lure compartment contains a water-based lure solution for attracting crawling pests that can be replaced as needed.

20 Claims, 4 Drawing Sheets

SPIDER AND INSECT TRAP WITH LURE COMPARTMENT

CROSS-REFERENCE TO RELATED APPLICATIONS

This application is a continuation of U.S. patent application Ser. No. 16/708,474 filed on Dec. 10, 2019.

FIELD OF THE INVENTION

The present invention is related to the field of pest control and, more particularly, to glue board traps for spiders and insects.

BACKGROUND

Traps having an adhesive upper surface, generally referred to as glue traps, have been used for many years to catch pests. Being simple and relatively inexpensive in construction, a glue trap is typically designed for one-time use after which the trap is disposed of, along with the pest caught thereon.

Woodstream Corporation of Lititz, Pa., who is the assignee of the instant application, has developed a glue trap including a tray with a replaceable glue board that is commercially available in Canada as the M773CAN Victor7 V Hold-Fast7 Glue Tray. Disposing of only the glue board while reusing the same tray reduces waste and makes the glue traps more cost effective to use.

Even though replaceable, adhesive boards may become ineffective prematurely due to their propensity to collect unwanted dust and debris. Over time, these contaminants render the adhesive area of the board ineffective for trapping insects or other pests. To protect the adhesive against such contamination, the glue boards may be folded into a tent configuration like that of the TERRO7 brand spider and insect traps commercially available from Woodstream Corporation. However, whether flat or folded, adhesive board traps for pests that move by crawling do not have a means of attracting these pests and therefore are dependent upon the target insects and spiders merely happening upon the trap.

In the case of flying insect pests, folding adhesive board traps have been developed that rely upon a selected type of pheromone adhesively secured within the trap to draw the target insect, commonly moth species such as the pantry moth. U.S. Pat. No. 5,588,250 to Chiba et al. (AChiba@) illustrates such a trap in FIG. 9 thereof which shows a prior art configuration of a pheromone-based trap. This trap, as well as the pheromone-based trap embodiments to which Chiba itself is directed are not, however, suitable for use as a broad-spectrum, non-specific insect and spider trap for household use where the target creeping pests are really a group of pests that can include a wide range of insect and arachnid species which can vary by geographical area, season or other factors.

In addition, while traps like those in Chiba provide for replaceable adhesive boards that enable the outer housing to be reused, the useful life of the trap is nonetheless limited by how long the pheromone remains active.

Therefore, a need exists for a glue trap for insects and arachnids that not only has replaceable adhesive boards, but that also includes a broad-spectrum lure that is both attractive to nearly all types of crawling pests and is also renewable, increasing both the operational and cost effectiveness of the trap.

SUMMARY

In view of the foregoing, the present invention is directed to a glue trap for insects and spiders. The trap includes a reusable housing into which a disposable glue board is inserted, the housing being provided with a lure compartment that contains a water-based lure solution which is preferably absorbed within a carrier material. The lure compartment has at least one wall with at least one aperture that is in airflow communication with the interior of the housing, moisture from the lure solution being released by evaporation through the aperture into the housing interior to increase the water vapor therein and thereby attract insects and spiders into the trap.

According to an embodiment, the housing includes first and second parts with each part being a mirror image of the other and having a generally planar body panel that is horizontal in use and a side wall substantially perpendicular to the respective planar body panel. The two parts are joined to one another, such as by a snap fit or other securing method, to bring the planar body panels into opposed relationship and the two side walls into opposed relationship, creating a generally rectangular enclosure defining and surrounding a trap interior with the side walls forming the longitudinal or long sides of the housing. The two lateral or short sides define generally rectangular openings at opposing ends of the housing. In addition, each of the side walls is preferably provided with at least one cutout to increase the access openings through which a pest may enter the trap interior.

Because of the mirror image structure of the first and second parts, the trap can be used with either of the planar body members on top. The two parts, which are preferably made of injection molded plastic, are preferably two different colors, respectively, one being light and one dark, to allow the user to select which trap orientation, e.g., dark side up or dark side down, best blends into the trap placement area so as to be visually less obtrusive. The glue board, which has an adhesive upper surface, is positioned in the trap interior on the upper surface of whichever planar body panel is on the bottom when the trap is in use. The glue board may be replaced as needed, with the new board being again positioned adjacent the same planar body panel or, if the trap is to be inverted, adjacent the opposing body panel.

Each planar body panel includes a cutout or aperture, preferably stepped around the edge thereof to form a shelf, that accommodates the lure compartment. The lure compartment preferably comprises a separate receptacle having a bottom wall and side walls that define a lure solution holding area, generally referred to herein as Athe holding area@, which is closed by a lid. According to an embodiment, the upper surface of the lid is generally planar with the outer edge of the lid extending beyond the side walls to form a flange. When the lure compartment is inserted within the body panel aperture, the flange is supported on the shelf so that the lure compartment is suspended within the housing interior and spaced above and away from the adhesive upper surface of the glue board positioned in the housing on the bottom planar member. The lure compartment may be readily removed from the housing by turning the trap over or by grasping the edge of the lid and pulling upwardly. The lid may also be provided with indentations to allow the user to insert a fingernail to lift the edge of the lure compartment.

According to an embodiment, the lure compartment is generally rectangular, having a longitudinal side generally parallel with the long side of the housing. The lid is slidably engaged with the receptacle to enable the lid to be pushed longitudinally in either direction to expose the holding area and enable the user to add lure solution thereto, and to then be slid back in the opposite direction to cover the holding area during use. Preferably the lid is detented to resist complete separation from the receptacle by being slid off of either end of the receptacle which could result in loss of the lid or possible difficulty in reengaging the lid with the receptacle.

Alternatively, the receptacle could have other shapes that would fit within corresponding shaped cutouts in the planar member. In addition, the lid may be secured to the receptacle in other ways, such as with a living hinge or other hinged connection, a snap fit, a friction fit or the like. However, for ease and durability of use the sliding lid is beneficial.

The top surface of the lid is preferably flush with the upper surface of the planar body panel, providing a sleek and elegant profile. However, the lid, and even part of the receptacle, may project above the upper surface of the housing provided the lure compartment is removable so as to enable the housing to be used with either housing part on the bottom as has been described. Specifically, when the trap is in use only the upper part of the housing has a lure compartment fitted therein while the aperture in the lower body panel, which is empty, is covered by the glue board positioned on the lower body panel.

To draw insects and spiders into the trap, the lure compartment contains a water-based lure. While water can be used alone as the lure, this is not preferred as the water will evaporate into the atmosphere too quickly. Therefore to slow the rate of evaporation and thereby increase the longevity of the lure, the lure is preferably composed of a mixture of water and a humectant such as glycerin, propylene glycol, or the like. According to an embodiment, the lure solution is a mixture of about 50% water and about 50% glycerin.

To further improve the operational effectiveness of the trap, the lure solution is absorbed within a carrier material that is placed within the lure compartment. When Aloaded@ with the desired amount of lure solution, the carrier material acts to slowly release the solution into the surroundings while also avoiding the chance that the solution will be spilled onto the glue board. The carrier may be any material that can absorb a water-based solution and then release the same slowly into the interior of the trap. Optional materials for the carrier include water beads and crystals made of super absorbent polymers, super absorbent fibers, fabrics made of the super absorbent fibers, either with or without a plastic film on one or both sides of the fabric, absorbent cellulose papers and hydrogel strips. As used herein, a super absorbent material is defined as a material, like a super absorbent polymer (SAP), that is able to absorb and retain extremely large amounts of a fluid relative to its own mass. A simply absorbent material, by contrast, retains a small amount of fluid relative to its own mass. Hydrogel strip is advantageous due to its ability to quickly absorb the lure solution, to stay moist over a long period of time, and to provide ease of use for the consumer.

To prevent the glue board from being dislodged and possibly adhering to the inner surface of the opposed planar member, the inner surfaces of the planar body panels include hold-down elements, preferably embodied as at least one pair of L-shaped tabs in opposed relationship. According to an embodiment one pair of opposed tabs is positioned approximately at the midpoint of the long sides. The horizontal legs of the L-shaped tabs are vertically spaced from the upper surface of the planar member so that a distance between the bottom surface of the horizontal legs and the upper surface of the planar member provides room for the edges of the glue board. The overlap by the horizontal legs creates a longitudinally extending channel for receiving the outer opposed edges of the glue board to retain the board adjacent the upper surface of the planar member currently positioned as the bottom of the trap, regardless of the orientation of the trap. As is known in the art, the outer opposed edges of the glue board are generally not adhesive so the glue board will not stick to the tabs.

To assist in handling of the trap, particularly when disposing of a used glue board, the outer surfaces of the housing side walls preferably include a textured region that provides the user with an ergonomic grip for grasping and holding onto the trap.

Further, while a trap that can be used with one side up and then flipped over to be used with the opposite side up is preferred, the present invention is also intended to include a trap that has only a single in-use orientation, as may occur if the lid of the lure compartment is not flush with the upper body panel. Accordingly, the trap may include a reusable housing having an upper panel and a lower panel in opposed relationship, with the upper and lower panels being joined, and held in spaced relationship, by two opposed side walls to define a trap interior. A disposable glue board is placed within the trap interior adjacent the lower panel of the housing, and a reusable lure compartment is placed adjacent the upper panel of the housing so as to extend at least partly into the trap interior. The lure compartment includes a holding area for a quantity of lure solution comprised of water and a humectant, the holding area having at least one aperture to provide airflow communication between the lure solution in the holding area and the trap interior while keeping the lure solution spaced away from the glue board. Crawling pests are drawn to the trap by the water vapor released as the lure solution evaporates.

Accordingly, it is an object of the present invention to provide a glue trap for insects and spiders that includes a reusable housing fitted with a disposable glue board and a lure compartment that contains a water-based lure solution, the lure compartment having at least one wall with at least one aperture that is in airflow communication with the interior of the housing, moisture from the lure solution being released by evaporation through the wall aperture into the housing interior to increase the water vapor therein and thereby attract insects and spiders into the trap.

Another object of the present invention is to provide a glue trap in accordance with the preceding object in which the lure compartment is removable and replaceable.

Yet another object of the present invention is to provide a glue trap in accordance with at least one of the preceding objects in which the lure compartment can be refilled with the water-based lure solution and reused.

Still another object of the present invention is to provide a glue trap in accordance with at least one of the preceding objects in which the lure solution includes water and a humectant such as propylene glycol, glycerin or the like.

Yet still another object of the present invention is to provide a glue trap in accordance with at least one of the preceding objects in which the lure solution is at least 50% water and preferably a mixture of about 50% water and about 50% glycerin.

A further object of the present invention is to provide a glue trap in accordance with at least one of the preceding objects in which the lure solution is absorbed in a carrier material within the lure compartment.

A still further object of the present invention is to provide a glue trap in accordance with the preceding object in which the carrier material is selected from the group consisting of water beads and crystals made of super absorbent polymers, super absorbent fibers, fabrics made of the super absorbent fibers and to include such fabrics made with or without a plastic film on one or both sides of the fabric, absorbent cellulose papers and hydrogel strips.

Yet a further object of the present invention is to provide a glue trap in accordance with at least one of the preceding objects in which the housing is made of injection molded plastic and has two long sides and two short sides so as to be substantially rectangular in shape, the long sides of the housing including hold-down elements that prevent the glue board from being inadvertently adhered to the opposing inner side of the housing should the trap be turned over.

A still yet further object of the present invention is to provide a reusable glue trap in accordance with at least one of the preceding objects in which the outer surface of the housing side walls includes a textured region to provide the user with an ergonomic grip for improved manual handling of the trap.

Another object of the present invention is to provide a glue trap including a reusable housing fitted with a replaceable glue board, and a removable and refillable lure compartment configured to contain a quantity of lure, the housing being constructed of two mirror-image parts that when coupled together define a generally rectangular enclosure surrounding a trap interior, each of the two parts having a generally planar body panel and a side wall, each planar body panel having an aperture formed therein to receive the lure compartment, the trap being useable with either planar body panel on top, the lure compartment being fitted within the aperture of the top-positioned planar body panel and the glue board being adjacent the upper surface of the opposing bottom-positioned planar body panel.

Yet another object of the present invention is to provide a glue trap in accordance with the preceding object in which the two parts are made of injection molded plastic, each being a different color from the other.

Still another object of the present invention is to provide a glue trap in accordance with at least one of the two preceding objects in which the lure compartment contains a quantity of lure solution composed of water and a humectant such as glycerin, propylene glycol or the like, absorbed within a carrier material.

A further object of the present invention is to provide a glue trap in accordance with the preceding object in which the lure solution is a mixture of about 50% water and about 50% glycerin.

A still further object of the present invention is to provide a glue trap in accordance with at least one of the two preceding objects in which the carrier material is at least one of water beads and crystals made of super absorbent polymers, super absorbent fibers, fabrics made of super absorbent fibers, absorbent cellulose papers and hydrogel strips.

Yet a further object of the present invention is to provide a glue trap in accordance with at least one of the five preceding objects in which the lure compartment includes a receptacle having a bottom wall and side walls that at least partially project into the housing interior while remaining spaced away from the glue board, the receptacle being covered by a lid that can be opened to add additional lure solution into the receptacle and then closed before remounting the lure compartment to the housing.

Another object of the present invention is to provide a glue trap in accordance with at least one of the six preceding objects in which outer surfaces of the side walls have a textured region to provide an ergonomic grip for manual handling of the trap.

Still another object of the present invention is to provide a glue trap configured to attract crawling pests including insects and spiders that includes a reusable housing having an upper panel and a lower panel in opposed spaced relationship, and joined by two opposed side walls to define a trap interior, a disposable glue board placed within the trap interior adjacent the lower panel of the housing, and a reusable lure compartment placed adjacent the upper panel of the housing and extending at least partly into the trap interior while remaining spaced above the glue board to allow a water-based lure solution held within the compartment to evaporate and attract crawling pests into the trap interior.

Yet another object of the present invention is to provide a glue trap having a reusable housing and lure compartment in accordance with any of the preceding objects that can be readily manufactured using known techniques, is easy to handle, and is durable, reliable and cost effective in use.

These and other objects of the invention, as well as many of the intended advantages thereof, will become more readily apparent when reference is made to the following description taken in conjunction with the accompanying drawings.

DETAILED DESCRIPTION OF THE EMBODIMENT(S)

In describing an embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1:
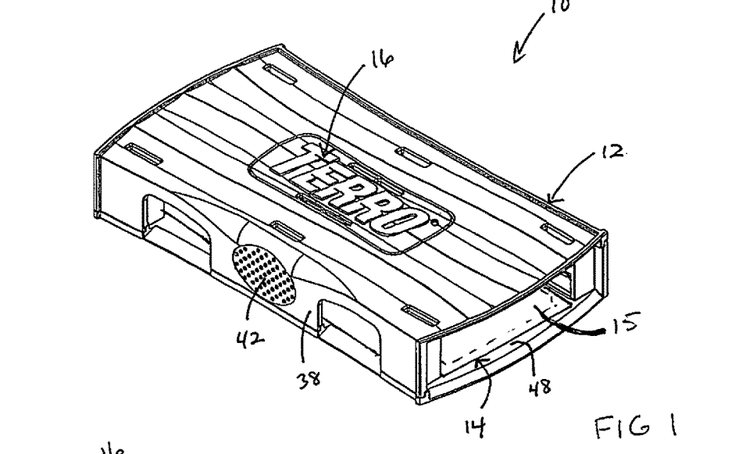
FIG. 1 is an isometric view of an assembled spider and insect trap in accordance with the present invention.
Figure 2:
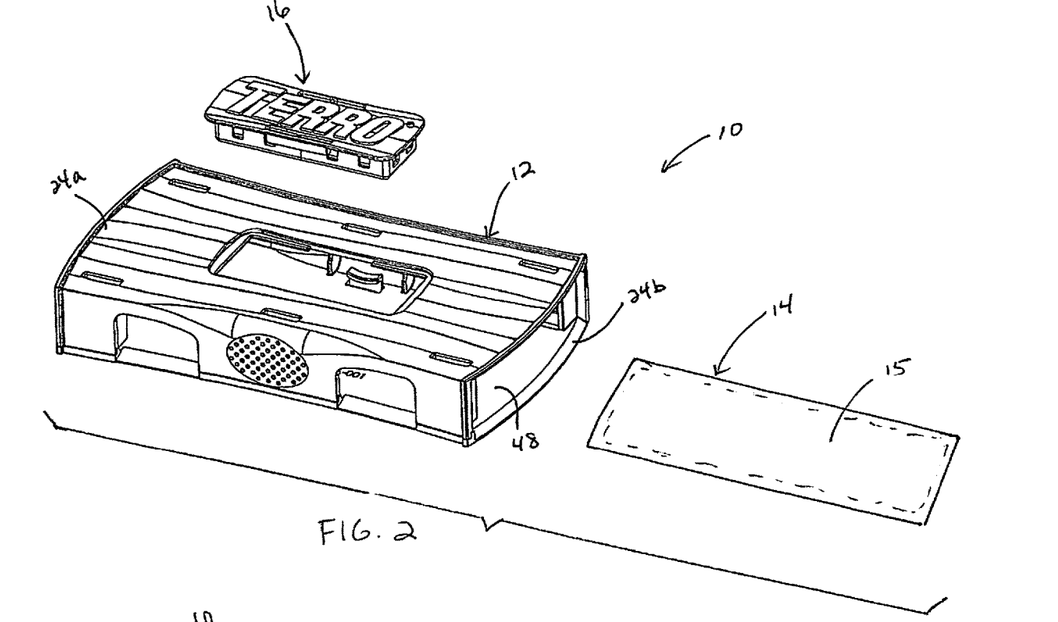
FIG. 2 is a trimetric exploded view of the housing, lure compartment and glue board components of the spider and insect trap shown in FIG. 1.
Figure 3:
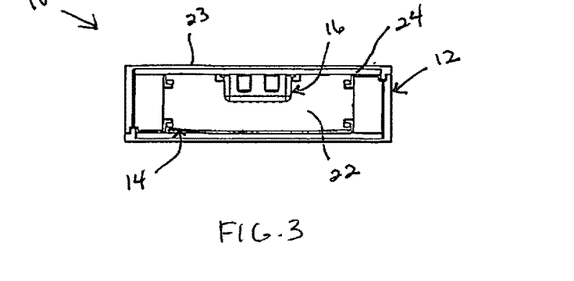
FIG. 3 is an end elevation view of the spider and insect trap shown in FIG. 1.

As shown in FIGS. 1-3, the present invention is directed to a glue trap for insects and arachnids, the latter being generally referred to herein as spiders without intending any limitation. The glue trap, generally designated by reference numeral 10, includes a housing generally designated by reference numeral 12, a replaceable glue board generally designated by reference numeral 14, and a lure compartment generally designated by reference numeral 16.

As shown in isolation in FIGS. 4, 4A, 4B and 5, the housing 12 includes a first part generally designated by reference numeral 18 and a second part generally designated by reference numeral 20. The first and second parts 18, 20 are joined to one another to form a generally rectangular enclosure (see FIG. 4) that defines and surrounds a trap interior generally designated by reference numeral 22 (see FIG. 4B).

Figures 4, 4A, 4B, 5:
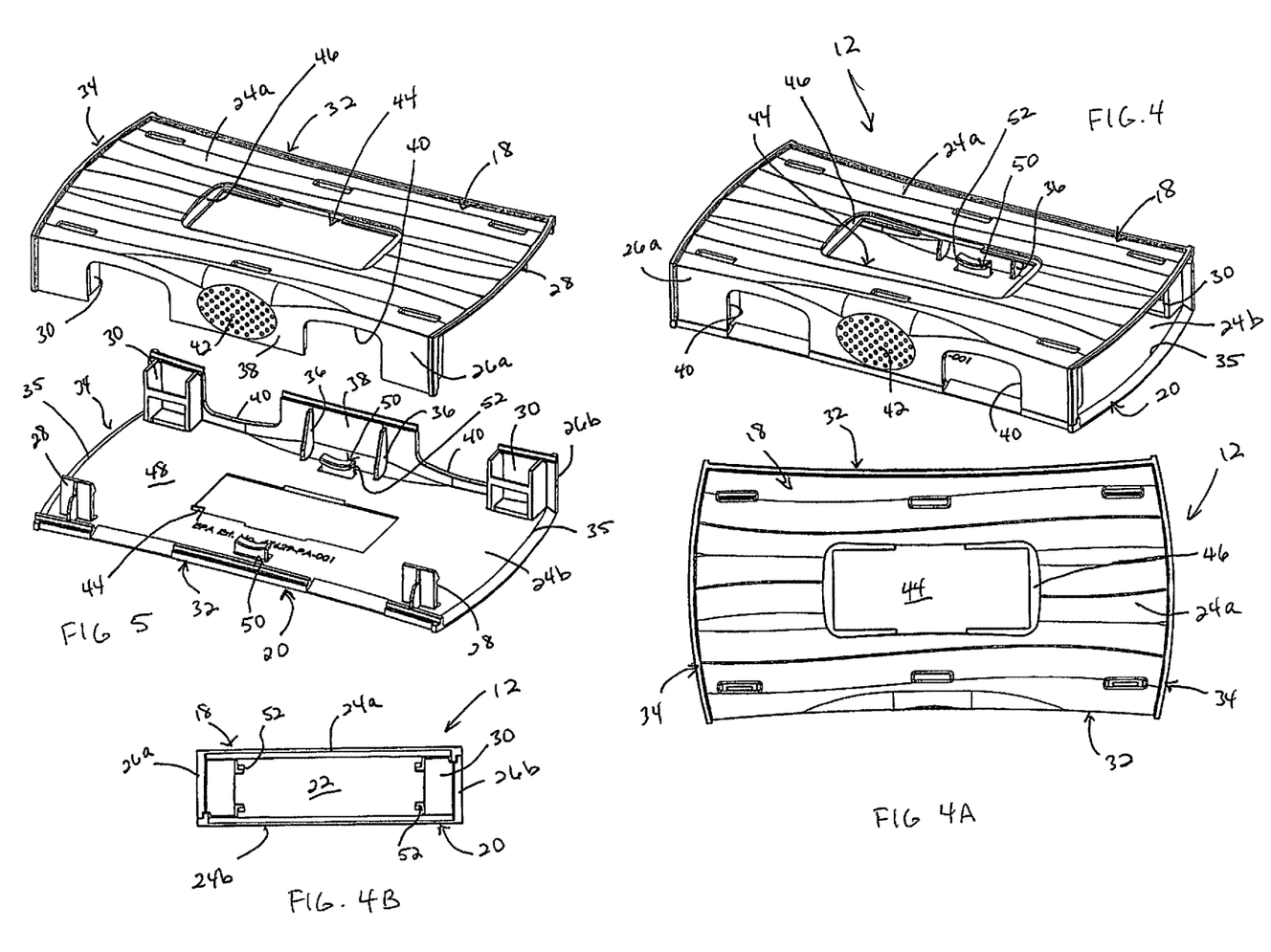
FIG. 4 is an isometric isolated view of the housing only of the trap shown in FIG. 1.
FIG. 4A is a top plan view of the housing shown in FIG. 4.
FIG. 4B is an end elevation view of the housing shown in FIG. 4.
FIG. 5 is an exploded view of the first and second parts of the housing shown in FIG. 4.
Figure 6:
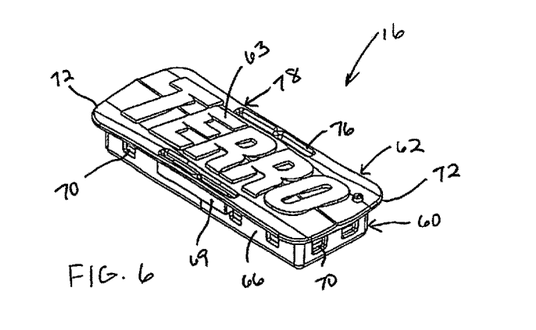
FIG. 6 is an isolated isometric view of the lure compartment only of the trap shown in FIG. 1.
Figure 6A:
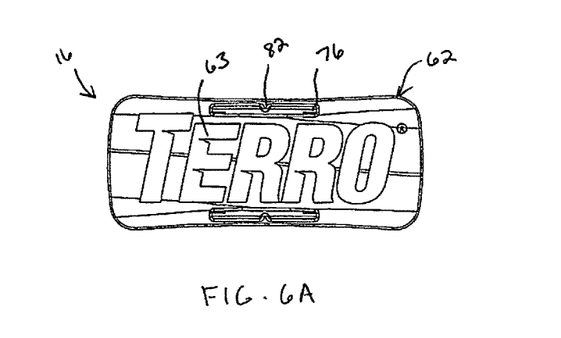
FIG. 6A is a top plan view of the lure compartment shown in FIG. 6.
Figure 6B:
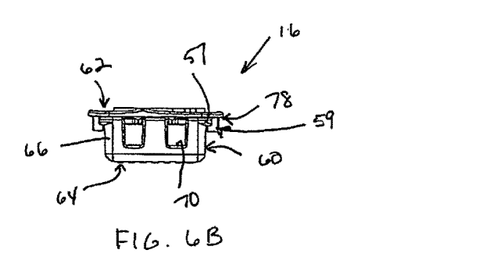
FIG. 6B is an end elevation view of the lure compartment shown in FIG. 6.
Figure 6C:
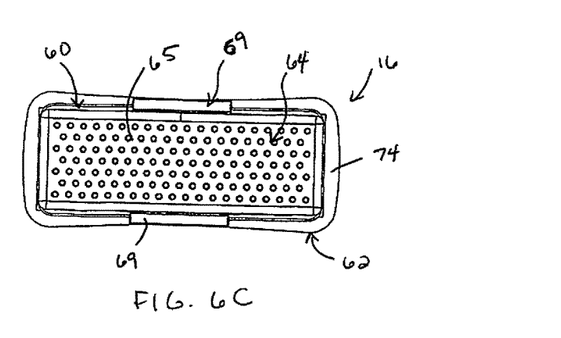
FIG. 6C is a bottom view of the lure compartment shown in FIG. 6.

According to the embodiment shown, the two parts are mirror-images of one another with each part 18, 20 having a generally planar body panel 24a, 24b that is horizontal in use and a side wall 26a, 26b that is substantially perpendicular to its respective planar body panel. While the two parts 18, 20 may be joined to one another in various ways, in the embodiment shown the two parts are connected to one another by clips 28 that are secured within sockets 30, preferably by a snap fit. When the two parts are connected, the side walls are in opposed relationship as are the planar body panels. The planar body members are generally parallel with the support surface, typically horizontal, upon which the trap is placed when in use.

As shown, according to an embodiment, the trap housing has two longitudinal or long sides generally designated by reference numeral 32 and two lateral or short sides generally designated by reference numeral 34. The opposed side walls are on the long sides, while the short sides are open to provide access openings into the trap interior for target pests. The outer edges of the open ends of the short sides preferably have a raised lip 35 which helps position the glue board 14 therebetween.

The side walls 26a, 26b are preferably reinforced with structural ribs 36 positioned along the longitudinal center part 38 of the side walls. Each side wall also includes cutouts 40 on either side of the center part 38 through which crawling pests can gain further access to the trap interior. In addition, the outer surface of the side wall center part 38 has a textured region 42. The textured regions 42 provide the user with an ergonomic grip for improved manual handling of the trap.

The generally planar body panels 24a, 24b include a cutout or aperture generally designated by reference numeral 44. The aperture 44 is preferably stepped around its perimeter to form a shelf 46 which supports the lure compartment 16 as will be further described hereinafter.

According to an embodiment having the mirror-image parts 18, 20 as shown, the trap 10 may be used with either of the parts in a top position. With reference to the orientation shown in FIG. 5, the glue board 14 is placed on the upper surface 48 of the bottom-positioned planar body panel 24b between the raised lips 35 on the open short ends of the housing (see also the assembled view of FIG. 1). To ensure that the adhesive surface 15 of the glue board does not become inadvertently adhered to the top-positioned planar body panel 24a, should the trap be turned over, the planar body panels 24a, 24b include hold-down elements generally designated by reference numeral 50.

The hold-down elements 50 are preferably embodied as L-shaped tabs 52 in opposed relationship. According to an embodiment one pair of opposed tabs 52 is positioned approximately at the midpoint of the long sides adjacent the center part 38 of the side walls. The horizontal legs of the L-shaped tabs are vertically spaced from the upper surface of the planar member so that a distance between the bottom surface of the horizontal legs and the upper surface of the planar member provides room for the edges of the glue board 14. The overlap by the horizontal legs creates a longitudinally extending channel for receiving the outer opposed edges of the glue board which, as is known in the art, are generally not adhesive so the glue board will not stick to the tabs.

The two parts 18, 20 are preferably made of injection molded plastic. According to an embodiment, each of the parts is a different color from the other, one being light such as off-white or beige, and the other being dark, such as brown or dark gray. The dual color construction allows the user to select which trap orientation, e.g., dark side up or dark side down, best blends into the trap placement area so as to be visually less obtrusive in a room or other household area.

The housing 12 keeps the glue board 14 above the elements on the floor, such as water, dirt, etc., that can render the glue board ineffective. Protection against dirt and debris or other environmental contaminants on the floor encroaching onto the glue board is further provided by the side walls.

As shown in isolation in FIGS. 6 and 6A-6C, the lure compartment 16 includes a receptacle generally designated by reference numeral 60 and a lid generally designated by reference numeral 62. The receptacle 60 has a bottom wall generally designated by reference numeral 64 and side walls 66 that define a lure solution holding area 68 as best seen in the exploded view of FIG. 7. The side walls 66 have at least one aperture 70 through which moisture in the form of water vapor may escape from inside the receptacle to the surrounding area. The lid 62 and the bottom wall 64 are preferably not apertured but may have textured upper and lower surfaces 63 and 65, respectively.

The lid 62 is removably secured to the top of the receptacle 60 to cover the holding area 68. According to an embodiment, the upper surface 63 of the lid 62 is generally planar and has an outer edge 72 around its perimeter that extends beyond the receptacle side walls 66 to form a flange 74 (see FIG. 6C). When the lure compartment 16 is inserted within the body panel aperture 44, the flange 74 is supported on the shelf 46 all around their perimeters so that the lure compartment receptacle 60 is suspended within the trap interior 22 and spaced above and away from the adhesive upper surface of the glue board 14 positioned in the housing on the bottom planar member (see FIG. 3). The lure compartment may be readily removed from the housing by turning the trap over or by grasping the outer edge 72 of the lid 62 and pulling upwardly. The lid may also be provided with indentations 76 to allow the user to insert a fingernail to lift the edge of the lure compartment.

According to the an embodiment shown, the lure compartment 16 is generally rectangular, having a longitudinal side 78 generally parallel with the long side 32 of the housing 12. The upper edge, generally designated by reference numeral 59, of the receptacle 60 has a flange 57 that is received within a track generally designated by reference numeral 69 that extends below the lid upper surface 63 on each longitudinal side (see FIG. 6B). As shown in FIGS. 8, 8A and 8B, the lid 62 is slidably engaged with the receptacle 60, with the flange 57 engaged within the track 69, to enable the lid to be pushed longitudinally in either direction to expose the holding area 68 and enable the user to add lure solution 80 (see FIG. 7) thereto. The lid is then slid back in the opposite direction to cover the holding area during use. Preferably the lid has a detent 82 to resist complete separation from the receptacle by being slid off of either end of the receptacle which could result in loss of the lid or possible difficulty in reengaging the lid with the receptacle.

Alternatively, the receptacle could have other shapes that would fit within corresponding shaped cutouts in the planar member. In addition, the lid may be secured to the receptacle in other ways, such as with a living hinge or other hinged connection, a snap fit, a friction fit or the like. However, for ease and durability of use the sliding lid is beneficial.

The top surface 63 of the lid is preferably flush with the upper surface 23 of the planar body panel 24 (see FIG. 3), providing a sleek and elegant profile. However, the lid, and even part of the receptacle, may project above the upper surface of the housing provided the lure compartment is removable so as to enable the housing to be used with either housing part on the bottom as has been described. Specifically, when the trap is in use only the upper part of the housing has a lure compartment fitted therein while the aperture in the lower body panel, which is empty, is covered by the glue board positioned on the lower body panel.

Figure 7:
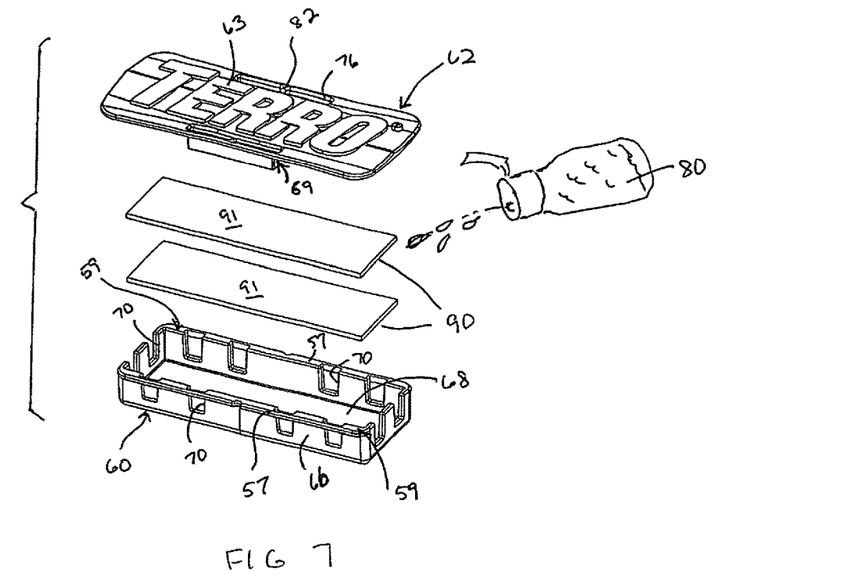
FIG. 7 is an exploded trimetric view of the lid, receptacle and carrier material components of the lure compartment shown in FIG. 6.
Figure 8:
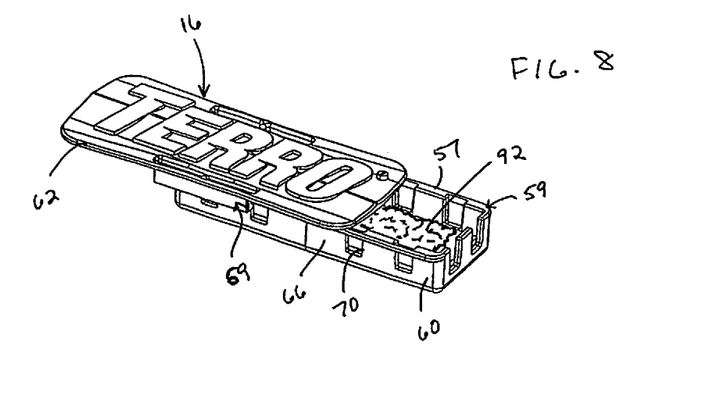
FIG. 8 is a trimetric view of the lure compartment shown in FIG. 6 with the carrier material fitted within the receptacle and the lid slid open.
Figure 8A:
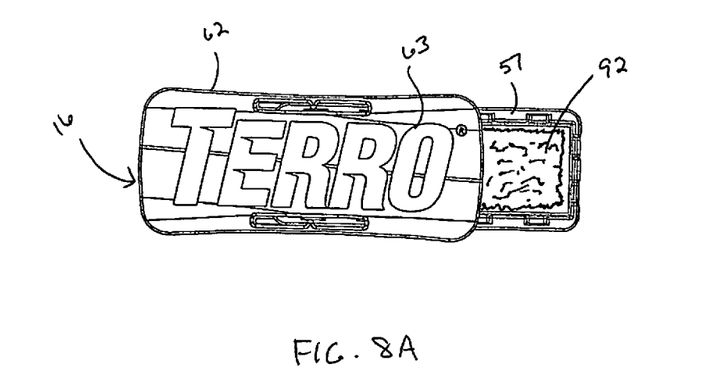
FIG. 8A is a top view of the lure compartment components shown in FIG. 8.
Figure 8B:
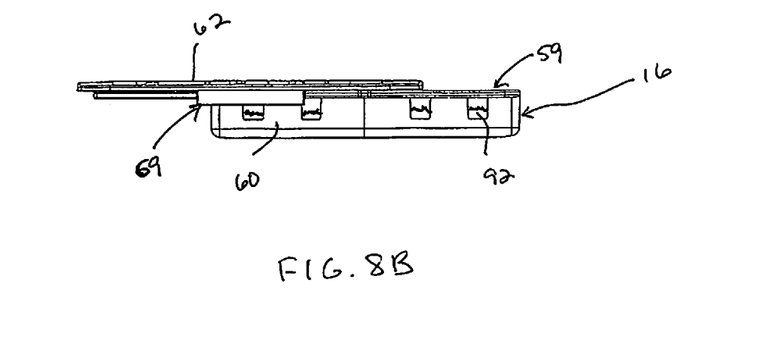
FIG. 8B is a side elevation view of the lure compartment components shown in FIG. 8.

To draw insects and spiders into the trap, the lure compartment is charged or loaded with a water-based lure solution 80 (see FIG. 7). While water can be used alone as the lure, this is not preferred as the water will evaporate into the atmosphere too quickly. Therefore, to slow the rate of evaporation and thereby increase the longevity of the lure, the lure solution is preferably composed of a mixture of water and a humectant such as glycerin, propylene glycol, or the like. According to an embodiment, the lure solution is at least 50% water and preferably a mixture of about 50% water and about 50% glycerin.

To further improve the operational effectiveness of the trap, the lure solution 80 is absorbed within a carrier material 90, such as a hydrogel strip 91 (see FIG. 7), that is placed within the lure compartment. When the carrier material 90 is Aloaded@ with the desired amount of lure solution, creating a so-called lure-soaked sponge 92 as shown in FIGS. 8, 8A and 8B, the carrier material 90 acts to slowly release the solution 80 into the trap interior 22 by evaporation while also avoiding the chance that the solution will be spilled onto the glue board 14 positioned beneath the lure compartment 16 in the trap 10.

The carrier material may be any substance that can absorb a water-based solution and then release the same slowly into the interior of the trap by evaporation. Optional materials for the carrier include water beads and crystals made of super absorbent polymers, super absorbent fibers, fabrics made of the super absorbent fibers, either with or without a plastic film on one or both sides of the fabric, absorbent cellulose papers and hydrogel strips. Hydrogel strip 91 (see FIG. 7) is advantageous due to its ability to quickly absorb the lure solution, to stay moist over a long period of time, and to provide ease of use for the consumer.

As an alternate configuration, it is possible for the housing to be made for a single orientation with a lure compartment that is refillable but not necessarily removable. In this case, the lid of the receptacle may be hingedly connected, snapped on and off, or the like. While such a trap cannot be turned over to display a different color as has been described herein, a single orientation spider and insect trap can provide the same advantages associated with having a separate refillable lure compartment containing a water-based lure to attract spiders and insects.

According to the embodiment shown herein, the housing parts 18, 20 are made of injection molded plastic of any kind known by persons of skill in the art to be suitable for pest trap products of the type described herein. The glue boards are of conventional construction and are mounted within the housing by sliding the board through one of the open short sides of the housing and under the hold-down elements so as to be on the upper surface of whichever planar body panel is on the bottom when the trap is in use and positioned between raised lips 35. The glue board may be replaced as needed, with the new board being again positioned adjacent the same planar body panel or, if the trap is to be inverted, adjacent the opposing body panel. The refillable lure compartment can be removed from the housing, opened by sliding the lid longitudinally, recharged by adding lure solution, closed and then reinserted into the body panel aperture. The result is a highly effective, reusable and cost-effective spider and insect trap.

The foregoing descriptions and drawings should be considered as illustrative only of the principles of the invention. The invention may be configured in a variety of shapes and sizes and is not limited by the dimensions of the embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A glue trap configured to attract crawling pests including insects and spiders comprising:
    a housing forming an enclosure, the housing having an aperture and a plurality of openings;
    a disposable glue board placed within the enclosure adjacent a lower panel; and
    a fillable lure compartment being removably inserted into the aperture and having a receptacle with a bottom wall and side walls that define a lure holding area containing a quantity of lure solution, a lid covers the lure holding area and a lure aperture in one of the side walls is in communication with the enclosure, with the lure compartment inserted within the aperture, the bottom wall is arranged above the glue board and spaced apart therefrom in a vertical direction.

2. The glue trap of claim 1, wherein the lure solution includes water and a humectant.

3. The glue trap of claim 1, wherein the openings are located to allow the crawling pests to enter the enclosure therethrough.

4. The glue trap of claim 1, wherein moisture from the lure solution is released by evaporation through the lure aperture and into the enclosure to attract the crawling pests.

5. The glue trap of claim 4, wherein the lure solution is absorbed within a carrier material that is contained within the lure compartment.

6. The glue trap of claim 2, wherein the humectant is glycerin.

7. The glue trap as set forth in claim 6, wherein the lure solution is approximately 50% water and 50% glycerin.

8. The glue trap of claim 1, wherein the lid is openable to add additional lure solution into the receptacle.

9. The glue trap of claim 1, wherein the aperture is formed in an upper panel of the housing arranged opposite the lower panel, the upper panel distinct from the lid of the lure compartment and arranged above the glue board.

10. The glue trap of claim 2, wherein the humectant is selected from the group consisting of glycerin and propylene glycol, the lure solution being at least 50% water.

11. The glue trap of claim 5, wherein the carrier material is selected from the group consisting of water beads and crystals made of super absorbent polymers, super absorbent fibers, fabrics made of super absorbent fibers, absorbent cellulose papers and hydrogel strips.

12. The glue trap of claim 1, wherein a lower panel of the housing includes hold-down elements to prevent the glue board from being turned over.

13. The glue trap of claim 1, wherein the housing is made of two mirror image parts of injection molded plastic, each of the parts including one opposed side wall and a planar body panel corresponding with one of an upper panel and a lower panel, the two mirror image parts being secured to one another to form the housing, the trap being usable with either of the planar body panels located in a bottom-most position.

14. The glue trap of claim 9, wherein the lower panel defines a second aperture sized to receive the lure compartment.

15. The glue trap of claim 9, wherein the lure compartment is suspended from the upper panel above the glue board and within the enclosure.

16. A glue trap, comprising:
 a housing forming an enclosure and including two opposing panels joined by at least one sidewall, each of the panels defining an aperture formed therethrough and a mounting surface adapted to hold a glue board within the enclosure; and
 a fillable lure compartment removably insertable into each of the apertures of the panels, the lure compartment having a receptacle with a bottom wall and side walls that define a lure holding area, the glue trap being useable with either of the panels in a top position, with the lure compartment fitted within the aperture of the top-positioned panel, wherein the mounting surface of the remaining bottom-positioned panel is arranged below the lure compartment.

17. The glue trap of claim 16, wherein each of the mounting surfaces of the panels include hold-down elements adapted to secure a glue board arranged within the enclosure.

18. The trap of claim 16, further comprising a glue board mounted within the enclosure to one of the mounting surfaces of the opposing panels.

19. A glue trap, comprising:
 a housing forming an enclosure and including two opposing panels joined by at least one sidewall, each of the panels defining:
  an aperture formed therethrough and adapted to receive a lure compartment therein for positioning the lure compartment within the enclosure; and
  a mounting surface adapted to hold a glue board within the enclosure; and
 a glue board arranged within the enclosure, the glue trap being useable with either of the panels in a top position with the glue board arranged on the mounting surface of the remaining bottom-positioned panel and the aperture of the top-positioned panel arranged over at least a portion of the glue board.

20. The glue trap of claim 19, further comprising a fillable lure compartment removably insertable into each of the apertures of the panels and arranged over at least a portion of the glue board.

* * * * *